(12) United States Patent
Grant

(10) Patent No.: US 10,990,356 B2
(45) Date of Patent: Apr. 27, 2021

(54) TAMPER-RESISTANT SMART FACTORY

(71) Applicant: Quantum Lock Technologies LLC, Knoxville, TN (US)

(72) Inventor: Erica Grant, Knoxville, TN (US)

(73) Assignee: Quantum Lock Technologies LLC, Knoxville, TN (US)

( * ) Notice: Subject to any disclaimer, the term of this patent is extended or adjusted under 35 U.S.C. 154(b) by 0 days.

(21) Appl. No.: 16/998,506

(22) Filed: Aug. 20, 2020

(65) Prior Publication Data
US 2020/0379734 A1 Dec. 3, 2020

Related U.S. Application Data

(63) Continuation-in-part of application No. 16/657,093, filed on Oct. 18, 2019, now Pat. No. 10,797,872.

(60) Provisional application No. 62/806,965, filed on Feb. 18, 2019.

(51) Int. Cl.
*G06F 7/58* (2006.01)
*G07C 9/00* (2020.01)
*G06N 10/00* (2019.01)

(52) U.S. Cl.
CPC ............ *G06F 7/588* (2013.01); *G06N 10/00* (2019.01); *G07C 9/00817* (2013.01)

(58) Field of Classification Search
CPC ....... G07C 9/00817; G07C 9/00; G06F 7/588; G06N 10/00; H04L 9/0869; H04L 9/0825; H04L 9/14
See application file for complete search history.

(56) References Cited

U.S. PATENT DOCUMENTS

| | | | | |
|---|---|---|---|---|
| 6,266,413 B1* | 7/2001 | Shefi | .................. | G06Q 20/3829 380/46 |
| 6,415,386 B1* | 7/2002 | Shi | ..................... | G07C 9/00309 340/5.2 |
| 6,665,714 B1* | 12/2003 | Blumenau | ............... | H04L 29/06 709/222 |
| 8,332,920 B2* | 12/2012 | Kass | ...................... | H04L 63/18 726/7 |

(Continued)

FOREIGN PATENT DOCUMENTS

WO  WO-2013025091 A1 * 2/2013 ........... H04L 9/3234

*Primary Examiner* — Ali S Abyaneh
(74) *Attorney, Agent, or Firm* — Chambliss, Bahner & Stophel, P.C.; Stephen D. Adams

(57) ABSTRACT

An access restriction system having a true random number generator (TRNG) to generate true random keys based on quantum-level physical properties and hub computer to provide those keys. An access-restricted component executes one or more tasks in response to receiving a verified task instruction. A component computer associated with the access-restricted component receives true random keys from the hub computer and stores the keys to a memory. A controller provides a task request to the component computer that includes a task instruction paired with a key. The component computer then verifies the task instruction by comparing and ensuring that the true random key stored to the memory matches the key received from the controller with the task request and then provides the verified task to the access-restricted component. The access-restricted component then carries out the verified task instruction.

17 Claims, 7 Drawing Sheets

(56) References Cited

U.S. PATENT DOCUMENTS

| | | | | |
|---|---|---|---|---|
| 8,745,394 B1* | 6/2014 | Rahat | .................. | H04L 63/0442 |
| | | | | 713/171 |
| 9,542,558 B2* | 1/2017 | Mensch | ................ | G06F 21/602 |
| 10,121,301 B1* | 11/2018 | Ren | .................... | G07C 9/00571 |
| 2009/0064744 A1* | 3/2009 | Wang | .................. | B60R 25/2018 |
| | | | | 70/278.1 |
| 2009/0240907 A1* | 9/2009 | Crandell | ................. | G06F 21/78 |
| | | | | 711/163 |
| 2012/0265990 A1* | 10/2012 | Liu | ................... | H04W 12/0609 |
| | | | | 713/168 |
| 2014/0201536 A1* | 7/2014 | Fiske | .................... | H04L 9/3228 |
| | | | | 713/183 |
| 2014/0232524 A1* | 8/2014 | Nakai | ..................... | B60R 25/24 |
| | | | | 340/5.61 |
| 2017/0211295 A1* | 7/2017 | Lin | ...................... | E05B 47/0012 |
| 2017/0358160 A1* | 12/2017 | Gardiner | ................. | G06F 3/147 |
| 2018/0254904 A1* | 9/2018 | Hwang | ................ | H04L 9/0869 |
| 2019/0147157 A1* | 5/2019 | Moorman | ............ | H04L 9/0861 |
| | | | | 713/171 |
| 2020/0218567 A1* | 7/2020 | Kim | ..................... | G06F 9/5066 |

\* cited by examiner

TAMPER-RESISTANT SMART FACTORY

CROSS-REFERENCE TO RELATED APPLICATIONS

This application is a continuation-in-part of application Ser. No. 16/657,093, filed Oct. 18, 2019, now U.S. Pat. No. 10,797,872, which claims priority to U.S. Provisional Application No. 62/806,965, filed Feb. 18, 2019; each of the foregoing applications is entitled QUANTUM RANDOM NUMBER GENERATOR LOCK and is incorporated herein by reference in its entirety.

FIELD

This invention relates generally to locking and securing mechanisms. More particularly, the present invention relates to securing mechanisms that are secured and unsecured using unique keys that are generated by a true random number generator that are based on quantum-level physical properties.

BACKGROUND

Conventional locks are prone to break-ins and are increasingly being replaced with "smart locks" in the name of increased convenience and security because no physical key is required and the locks can be unlocked using a mobile device. Unfortunately, smart locks only give the illusion of increased security. In actuality, they are even less secure than traditional locks. Because most smart locks are built only with convenience in mind, many still have a key face, which leaves them vulnerable to being physically picked using traditional lock picking methods. Additionally, passwords used by smart locks are often communicated between the smart lock and a mobile device wirelessly in plain text and are, therefore, susceptible to surveillance and interception. Attempts have been made to encrypt passwords using pseudo-random number generators (PRNG). In operation, PRNGs use a randomly-selected number as a "seed" and an algorithm then generates a sequence of numbers that appear random. However, if the seed is discovered, sophisticated parties can uncover the sequence of numbers generated by the PRNG.

Similar issues might also impact other computer-connected equipment, including equipment found in "smart factories". In general, the term "smart factory" describes a highly-digitalized and connected environment where machinery and equipment are able to improve processes through automation and self-optimization. Equipment and processes in a smart factory are often coordinated with one another to enable high levels of precision and adaptability and design changes, which enables production to be optimized for changes in supply and demand. However, a disadvantage of the inter-connected nature of a smart facility is that a security flaw or weakness that results in one component being compromised could result in the entire facility being comprised.

Accordingly, what is needed, is a securing system that may be employed in securing the inter-connected equipment in "smart factories" while also being more secure against hacking.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. In other cases, the term "interconnected" means components of a system (e.g., equipment in a factory) that are configured to communicate with one another either via a wired, wireless, or other means of communication. The term "operatively connected" is such an attachment, coupling or connection that allows the pertinent structures to operate as intended by virtue of that relationship.

The term "true random number generator" or "TRNG" means a device that generates random numbers from a physical process and not through a mathematical algorithm. The physical processes may include microscopic-level phenomena or quantum-level phenomena. There are many methods by which a truly random number can be generated using quantum mechanics or quantum-level information. As a non-limiting example, true random numbers may be generated by measuring the random spin of photons. The spin or polarization of photons is inherently random in nature. Certain materials, shaped into crystals, are known to interact with photons and to admit or reject photons based on their spin. By directing a stream of photons at the crystal (such as light from a laser), some photons are admitted while others are reflected. Detectors placed on each side of the crystal detect reflected photons as 1's and admitted photons as 0's. To create a 256-digit random number, 256 of the random 1's and 0's are collected. The term "true random number" means this random number generated by a TRNG. The term "user device" means a device capable of receiving and transmitting encrypted messages and encrypting and decrypting messages, such as a mobile phone, smart key or key fob. The term "wireless network" means a Bluetooth, Wi-Fi, or other similar means of wireless connectivity. The term "factory" means part of or relating to any computer or computer-controlled or computer-driven machine or other device that is configured to execute one or more tasks.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by an access restriction system having a true random number generator to generate true random keys based on quantum-level physical properties and hub computer to provide those keys. An access-restricted component executes one or more tasks in response to receiving a verified task instruction. A component computer associated with the access-restricted component receives true random keys from the hub computer and stores the keys to a memory. A controller provides a task request to the component computer that includes a task instruction paired with a key. The component computer then verifies the task instruction by comparing and ensuring that the true random key stored to the memory matches the key received from the controller with the task request and then provides the verified task to the access-restricted component. The access-restricted component then carries out the verified task instruction.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
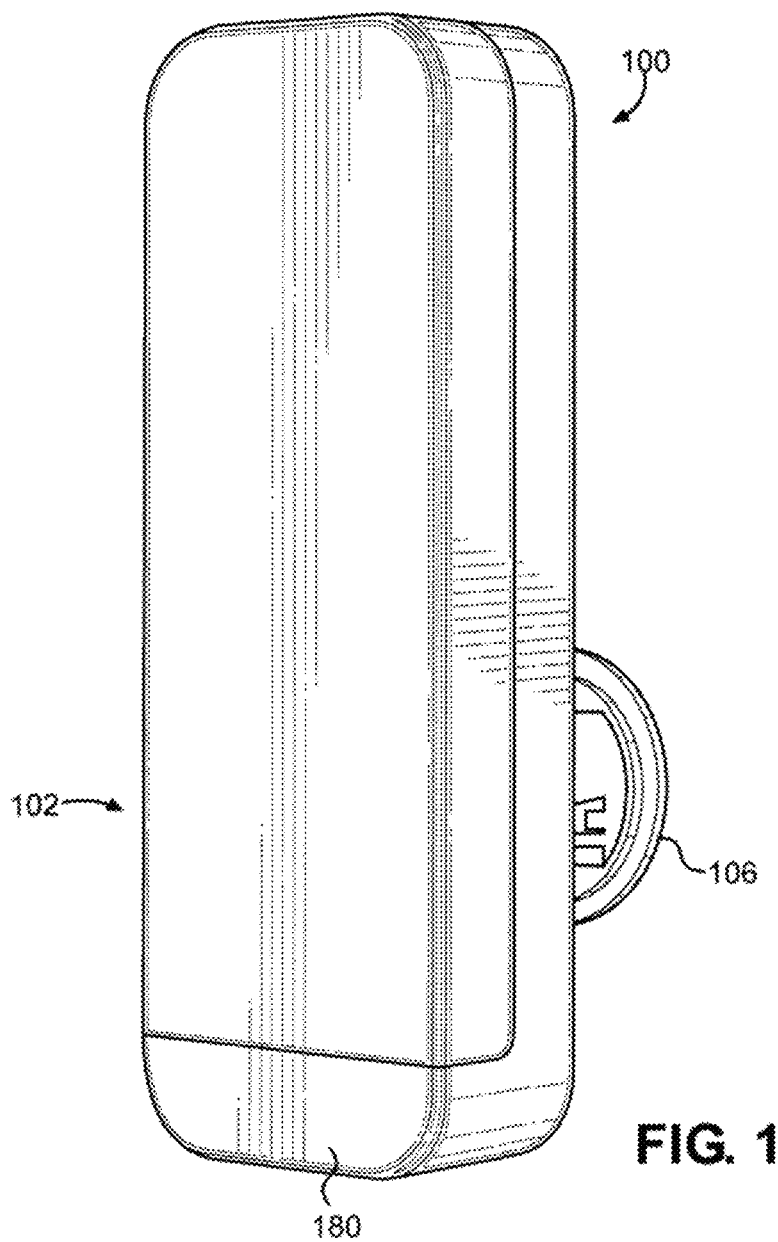
FIG. 1 is a front perspective view showing a lock system according to an embodiment of the present invention.
Figure 2:
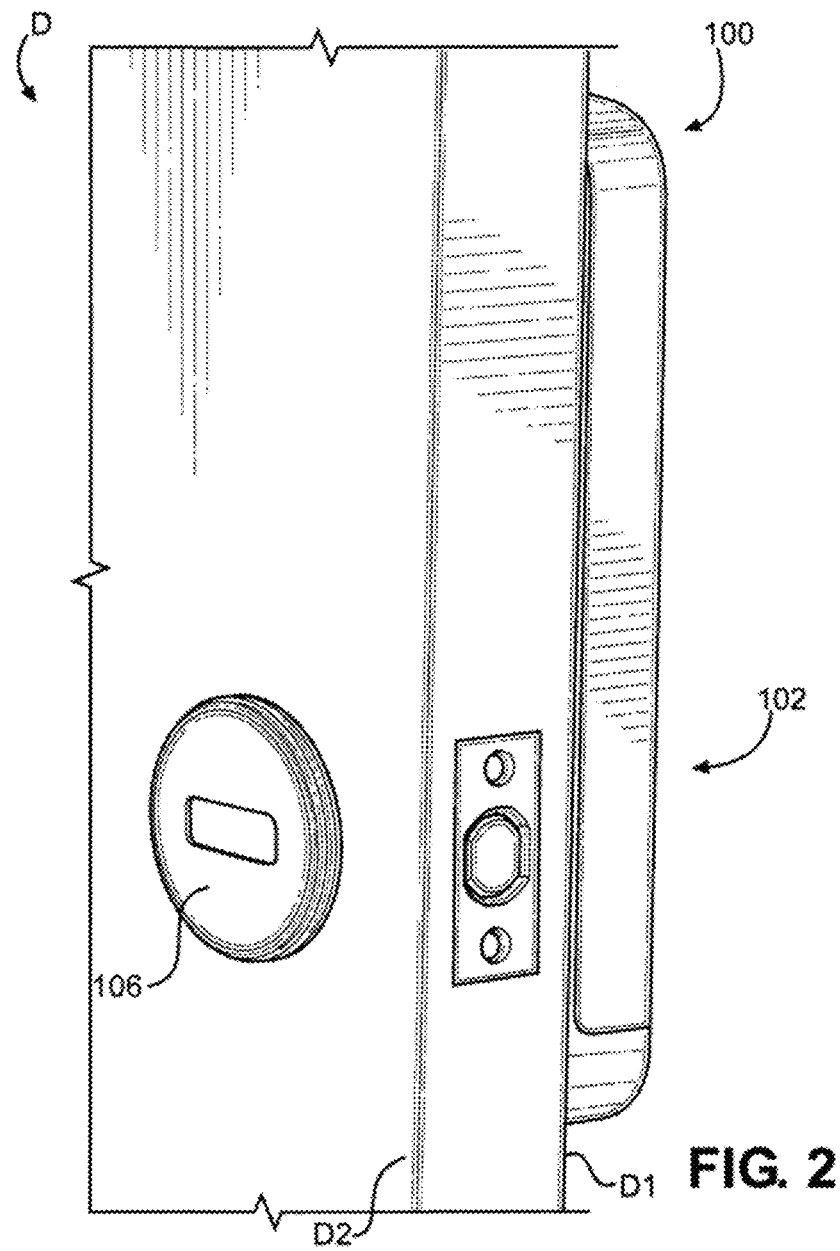
FIG. 2 is a perspective view showing the lock system of FIG. 1 mounted to a door.
Figure 3:
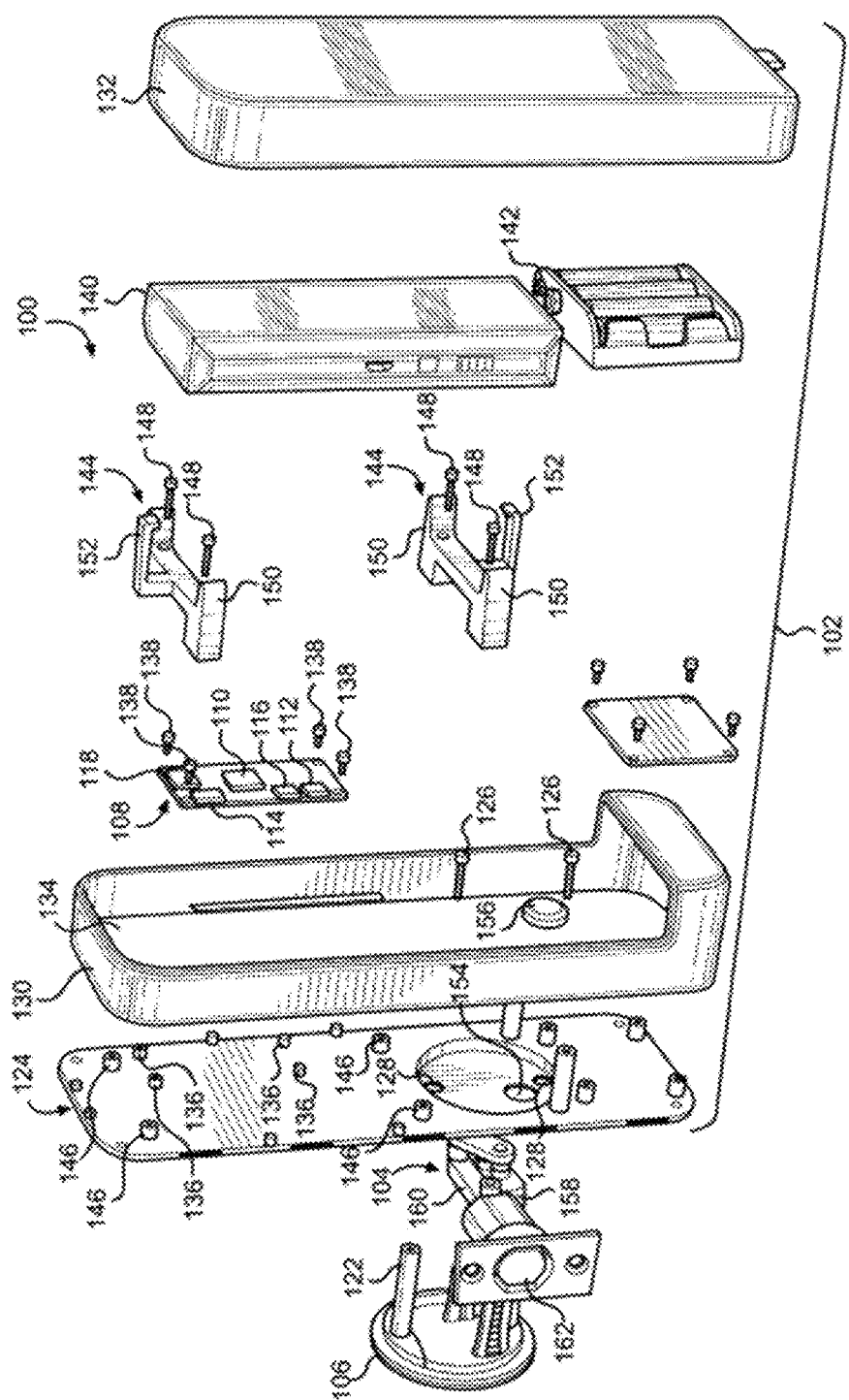
FIG. 3 is an exploded view showing the lock system of FIG. 1.

Referring now to the drawings in which like reference characters designate like or corresponding characters throughout the several views, there is shown in FIGS. 1-3, a computer-controlled lock system for securing lock 100 that may be mounted to door D according to an embodiment of the present invention. In this embodiment, lock 100 generally includes control assembly 102 that is mounted to rear side D1 door D (e.g., inside of a room secured by the lock); lock assembly 104 that is located within the door and that is electrically connected to and controlled by the control assembly; and front plate 106 that is mounted to front side D2 of the door (e.g., outside of the room secured by the lock). Front plate 106 extends through the door and is attached to the control assembly. For increased security, front plate 106 is preferably blank (i.e., does not have a slot for a key) to prevent lock 100 from being physically picked using traditional lock picking methods. In other embodiments, without limitation, lock 100 could include locks found on doors in a hotel, school, office, etc. Lock 100 could also be found on other types of doors, lids, etc., such as P.O. boxes, safes, vehicle door and ignition, bicycle locks, padlocks, and the like.

Control assembly 102 includes onboard computer 108, having CPU 110, memory 112, and controller 114, which controls the operation of lock assembly 104. Under certain conditions, computer 108 sends an unlock command to lock assembly 104 that switches lock 100 from a locked mode, where the door D is prevented from opening by the lock, to an unlocked mode, where the door can be opened. Computer 108 may also send a lock command to lock assembly 104 to lock the door under other conditions, as discussed below.

Computer 108 carries out the unlocking operation in response to receiving a valid and correct public key. This public key is received at computer 108 by transmitter-receiver 116, which is configured to wirelessly send or receive information and to store that information to memory 112. The public key is a random number that is generated by random number generator 118, which, unlike the prior art, is a true random number generator (TRNG) that generates true random numbers. In preferred embodiments, the random numbers are generated based on quantum-level phenomena. The random numbers generated by TRNG 118 are stored to control assembly 102 in memory 112. A copy of the public key is then transmitted and stored to a user device (not shown), which could be a programmable key card, a key fob, a smartphone, or another similar device, via transmitter-receiver 116. When a user later transmits a public key to control assembly 102, the public key is verified by CPU 110 to ensure that the public key it received from the user device matches the previously-issued public key that is stored to memory 114. If the transmitted public key matches the stored public key, computer 108, via controller 110, sends the unlock command to lock assembly 104 to switch the lock to the unlocked mode.

Control assembly 102 is located on rear side D1 of door D, front plate 106 is located on front side D2 of the door, and lock assembly 104 is located within the door between the front and rear sides. Elongate receivers 122 extend away from a back surface of front plate 106, through door D, past lock assembly 104, and to a back surface of door mounting plate 124. Prior to mounting door mounting plate 124 to door D, lock assembly 104 is inserted into the door D. Door mounting plate 124 is attached to front plate 106 by passing threaded fasteners 126 through openings 128 and then into threaded openings at the ends of receivers 122. Lock housing 130 surrounds door mounting plate 124 and, together with front cover 132, form an enclosure for housing the other components of control assembly 102. In this particular embodiment, lock housing 130 is fixedly connected to the door backing plate 124, such as through welding, gluing, etc. However, in other embodiments, lock housing 130 is separable from door backing plate 124. Additionally, front cover 132 slides or flips downwards to cover a front opening 134 formed in lock housing 130.

Computer 108 is mounted to openings 136 formed in door mounting plate 124 via threaded connectors 138. In addition, a pair of battery packs, including primary rechargeable battery pack 140 and backup battery pack 142 are mounted to door mounting plate 124. A pair of mounting clips 144 are mounted to openings 146 via threaded connectors 148. Each mounting clip 144 has a pair of spaced apart shoulders 150 and a bendable securing arm 152. Top and bottom ends of primary battery 140 are inserted into clips 144 between shoulders 150 and are held securely by securing arm 152. Primary battery 140 may be removed for recharging, replacement, etc. by bending securing arms 152 outwards and extracting the battery from the clips. In certain embodiments, primary battery pack 150 and backup battery pack 142 are each connected to and provide power to each of computer 108 and lock assembly 104 by a wired connection. Preferably, backup battery pack 142 is only activated if primary battery pack 140 fails or is removed from the control assembly 102 for recharging, replacement, etc. Alternatively, direct power (e.g., 120-volt supply) may be provided in addition or in place of batteries 140, 142.

The wired connection is formed between control assembly 102 and the lock assembly 104 by passing wires (not shown) from control assembly through aperture 154 in the door mounting plate 124 to lock assembly. Preferably, to protect the wires, protective grommet 156 or other similar device is provided at aperture 154. Lock assembly 104 includes motor 158 or other similar apparatus, such as a solenoid magnet, connected to actuator arm 160 that moves deadbolt 162 in and out to engage or disengage a strike plate (not shown) on a door jamb in order to lock or unlock the deadbolt and to prevent or allow the door to be opened.

Figure 4:
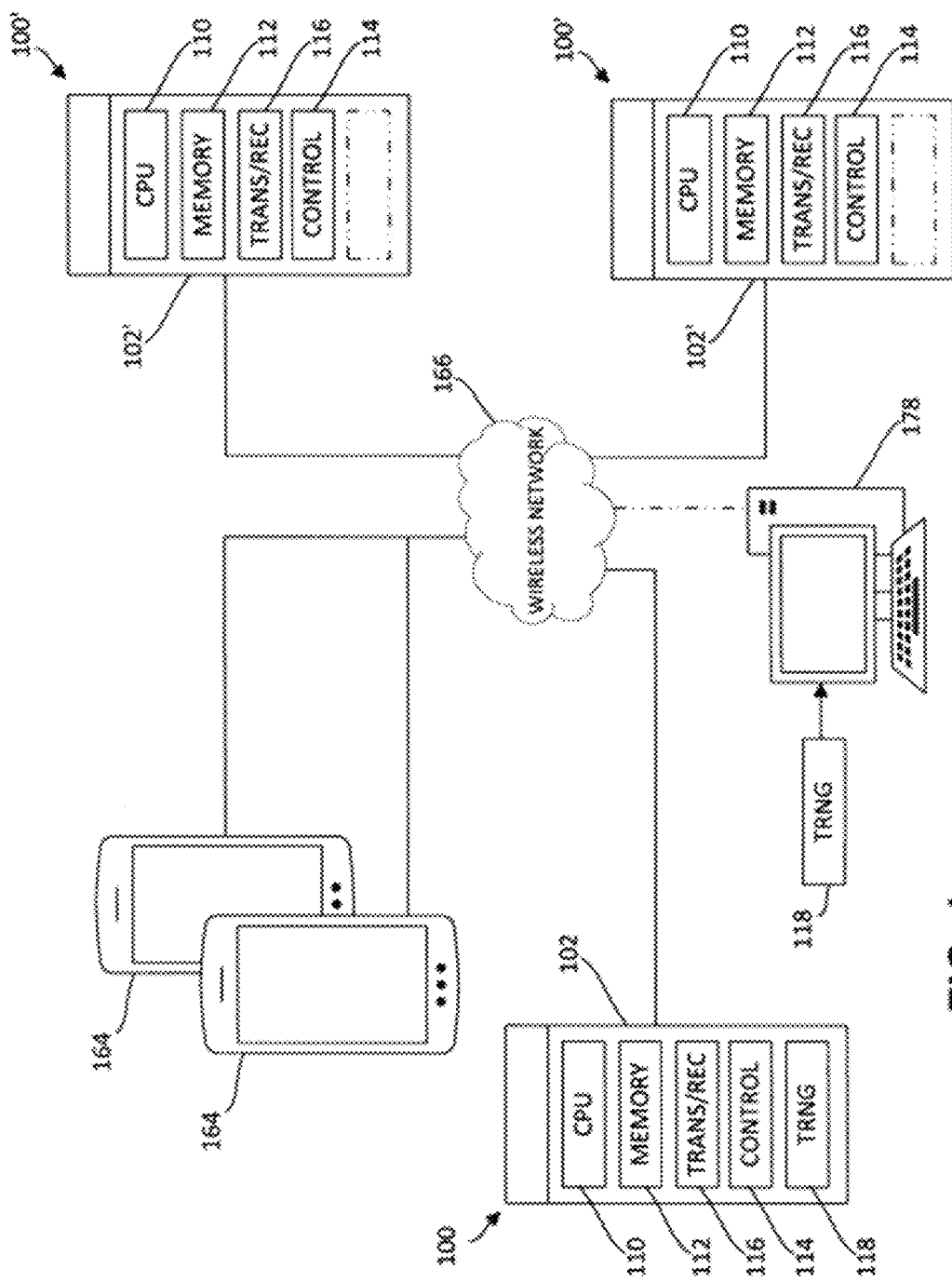
FIG. 4 is a schematic diagram illustrating a system of locks according to an embodiment of the present invention controlled by a pair of user devices over a wireless network.

With reference now to FIG. 4, there is shown lock 100 having control assembly 102 that is identical to that discussed above (referred to as a "primary lock" in this example). Also provided is a pair of secondary locks 100' having control assemblies 102' that are structurally similar to primary lock 100 and control assembly 102 but that lack TRNG 118. Primary lock 100 and secondary locks 100' are connected together with one another and with one or more user devices 164 over wireless network 166. This scenario might occur, for example, at a residence where a single, more expensive primary lock 100 (e.g., a front door lock) is used to generate all of the public keys used to unlock the door locks throughout the house, including the less expensive secondary locks 100' (e.g., a back door lock). Alternatively, the job of generating and disturbing public keys to locks 100' and user devices 164 could be carried out by a central computer 178 having a TRNG 118. This scenario might occur, for example, in a hotel, where user devices 164 are room keys and secondary locks 100' are located on guest doors that are programmed by hotel staff using computer 178 located at the front desk of the hotel.

Before locks 100, 100' can be utilized by a user, the lock and user devices 164 must be initialized by being provided with copies of public keys since public keys are used to unlock the locks. For lock 100, the TRNG 118 is located onboard with the control assembly 102. Therefore, once the public key is generated, it can easily be saved directly to the onboard memory 112. However, since locks 100' and user devices 164 are likely remote from the TRNG 118, the public key must be transferred to them prior to being saved to and used by those devices. This transfer could occur using a hard or physical connection (e.g., a USB connection, memory stick, etc.) to move the public key between lock 100 and lock 100' before the locks are installed. More preferably, however, the public key is transferred from lock 100 to lock 100' and to user devices 164 wirelessly (e.g., Wi-Fi or Bluetooth) over wireless network 166, as further discussed below.

Once transferred, a copy of the public key is saved to user devices 164 and to locks 100'. In certain embodiments, the same public key may be used for each of the locks 100, 100'. In that scenario, a copy of a single identical public key would be saved to each lock 100, 100' and to user devices 164 (i.e., one public key total across the entire system). However, in other embodiments, different public keys are generated by TRNG 118 for each of the locks 100, 100' (i.e., three public keys total across the entire system). In that case, each lock 100, 100' would have its own unique public key and the user devices 164 would store a copy of three different public keys. Even more preferably, each user device 164 is provided with public keys that are unique to that device. In that case, for the illustrated embodiment, a total of six unique public keys would be generated. The locks 100, 100' would each have copies of two different public keys. One of those public keys would be used by one user device 164 and the other would be used by the other user device. Once the system is initialized, when the user wishes to unlock one of the locks 100, 100' she transmits a copy of the public key stored on her device 164 back to the selected lock. CPU 110 compares the transferred public key to the public key that is stored to memory 112. If they match, CPU 110 directs controller 116 to send the unlock command and lock 100 is unlocked.

Preferably, once lock 100 has been unlocked and the door that the lock is mounted to is opened, the lock automatically switches back to the locked mode so that the door locks automatically when closed. In other embodiments, user device 164 provides means for sending a lock command, such as a "lock" button, to switch lock 100 from the unlocked mode to the locked mode. In other embodiments, a manual override for locking or unlocking lock 100 may be provided on the lock. For example, in some embodiments, lock 100 works in conjunction with a door handle and turning the door handle automatically unlocks the lock. In still other embodiments, a thumb turn or other manual override device may be provided on lock 100 to either lock or unlock the lock.

In preferred embodiments, the public keys are single-use only and may only be used once to unlock lock 100. In that case, public keys are generated sequentially by TRNG 118 for each user device 164. After the public key stored on a particular user device 164 has been used, TRNG 118 generates a new public key for that particular device, which newly-generated key must be used the next time that that particular device is used to open the door.

Figure 5:
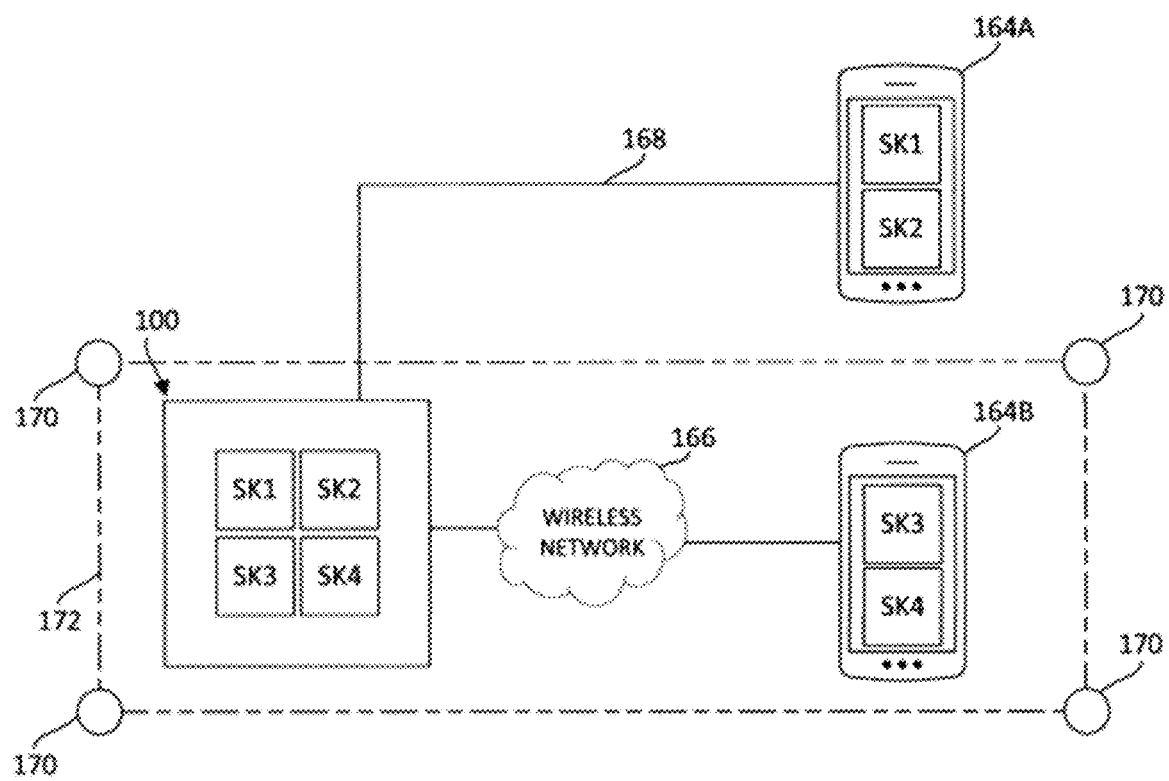
FIGS. 5-8 are schematic diagrams illustrating a process for encrypting, decrypting and transmitting private and public keys between locks and user devices according to an embodiment of the present invention.

Preferably all wireless transfers of public (and private) keys, such as between lock 100 and lock 100' or user device 164 and vice versa, used in the locking and unlocking process occur in a secure format using two-way asymmetric (i.e., public key) encryption. Such an encryption method is illustrated in FIGS. 5-8. In FIG. 5, lock 100 and two user devices 164A, 164B are shown. A first public key PK1 will be transferred from lock 100 to user device 164A and a second, different public key PK2 will be transferred from the lock to user device 164B for use in unlocking the lock. However, before either of those transfers occurs, the first and second public keys PK1, PK2 are encrypted. As discussed below, they are encrypted and decrypted using two private (or secret) keys each. One set of two private keys, SK1 and SK2, is used to encrypt and decrypt the first public key PK1 when it is transferred between the lock 100 and user device 164A. A second, different set of two private keys, SK3 and SK4, is used to encrypt and decrypt the second public key PK2 when it is transferred between the lock 100 and user device 164B. Before that encryption can occur, the private keys, SK1 thru SK4, must be transferred and saved to the respective user device 164A, 164B.

Preferably the transfer of private keys, SK1 thru SK4, from lock 100 to user device 164A and 164B occurs via a secure connection and not via an unsecured wireless connection. Similarly, the transfer of private keys, from computer 178 to lock 100' (shown in FIG. 4) occurs via a secure connection and not via an unsecured wireless connection. These transfers may occur, for example, via a hardwired, USB, SD card, or other direct (i.e., not wireless) connection, such as connection 168 between the lock 100 and user device 164A. Private keys, SK1 thru SK4, may also be transferred wirelessly over wireless network 166, which may include a wireless broadband, optical, near field or induction, Wi-Fi, or Bluetooth connection. However, in that case, since many forms of wireless communication are prone to unauthorized interception, additional security measures should be implemented. One way that security for this this wireless transmission can be improved is through the use of quantum key distribution (QKD). In other embodiments, 2-factor authentication could be used, where a third party, such as an administrative user, must confirm the transfer of the private keys to a known device. Yet another way to improve security is by ensuring that the wireless transfer of the public key occurs between devices that are within a given proximity to one another. This could be accomplished through geo-fencing using GPS or proximity detection using Bluetooth and the like. As illustrated in FIG. 5, a plurality of proximity beacons 170 may be used to create a mesh or field 172. In that case, in order for lock 100 to wirelessly transfer public keys or private keys to another device, such as device 164B, both devices must be within field 172.

Figure 6:
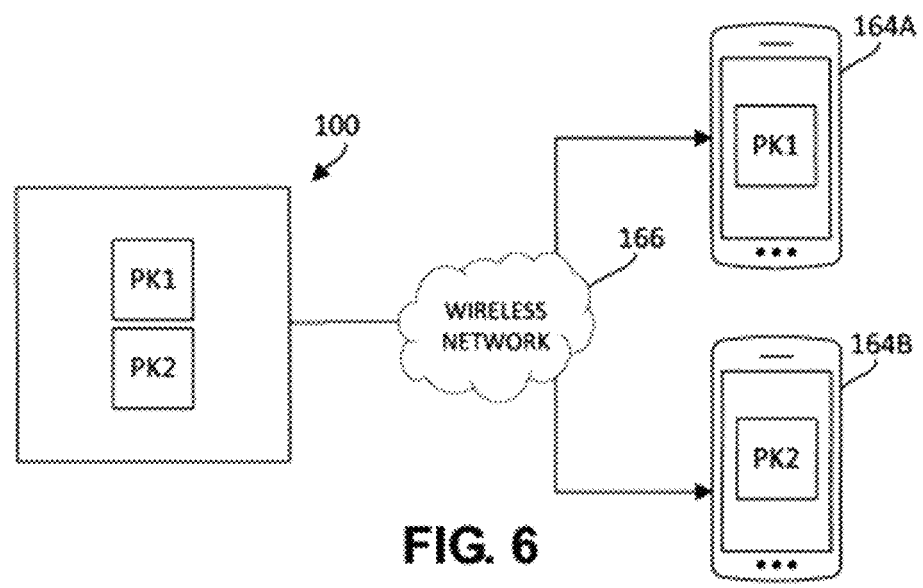
Figure 7:
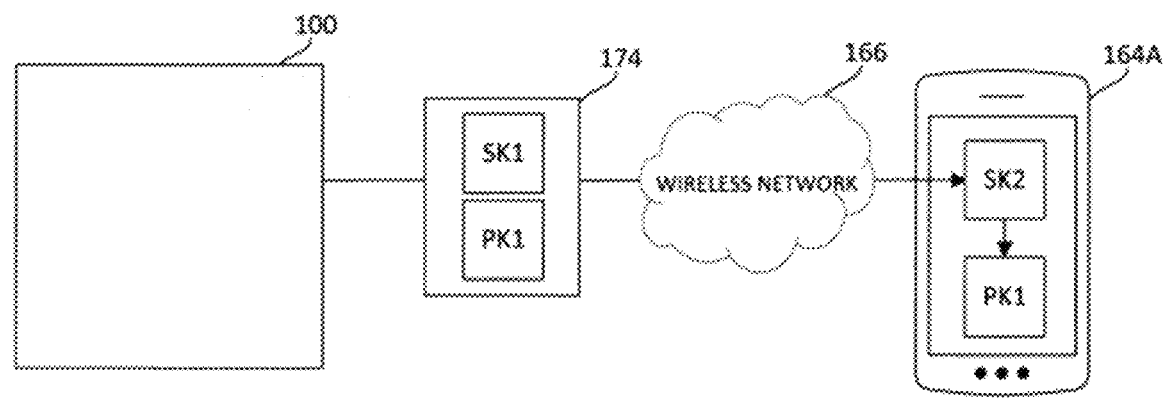
Figure 8:
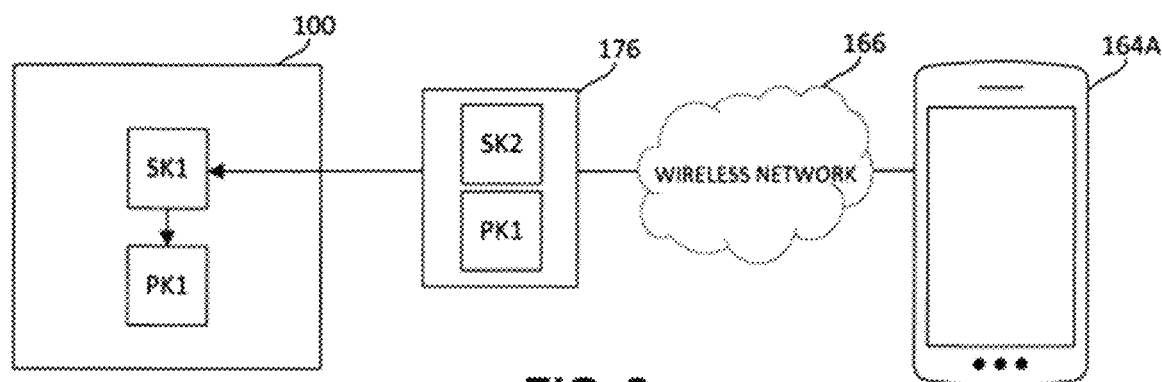

As shown in FIG. 6 and as further detailed below, once copies of two private keys are saved to each device that intends to share a public key (e.g., lock 100 and user device 164A or lock 100 and user device 164B), information, such as the public keys, can be securely transferred between those devices. As discussed above, in this particular case, lock 100 is provided with an onboard TRNG 118 (FIG. 4) that generates random numbers, including both public keys and private keys, which are then stored on the lock. With reference to FIG. 7, public key PK1 may be encrypted by lock 100 with private key SK1 using an encryption algorithm, such as the RSA algorithm, the Advanced Encryption Standard (AES) algorithm, or other encryption algorithms, to form first encrypted message 174. First encrypted message 174 may then be securely transferred to user device 164A over wireless network 166. First encrypted message 174 is then decrypted by user device 164A using private key SK2 to retrieve public key PK1, which is stored on the user device.

When the user wishes to unlock lock 100, the process is reversed in order to transmit public key PK1 back to the lock. More particularly, public key PK1 is encrypted by user device 164A with private key SK2 using an encryption algorithm to form a second encrypted message 176. Second encrypted message 176 may then be securely transferred to lock 100 over wireless network 166. Second encrypted message 176 is then decrypted by lock 100 using private key SK1 to retrieve public key PK1. As described above, the computer associated with lock 100 then carries out a verification step to ensure that the public key retrieved from second encrypted message 176 matches the public key that was previously transmitted to user device 164A via first encrypted message 174. If the public keys match, the lock 100 is switched to the unlock mode. In certain preferred embodiments of the invention, lock and unlock steps are recorded and verified using a distributed ledger.

Referring again to FIG. 4, a similar encryption procedure is used when public and private keys are generated by a central computer 178. In that scenario, certain of the random numbers generated by the TRNG 118 are the public and private keys that will ultimately be used by hotel guests to unlock their hotel door. These keys are transferred to guest key cards in two encrypted stages. First, the public and private keys are transferred from computer 178 to locks 100' securely in encrypted form and are then transferred from locks 100' to hotel guests' devices 164 in a second secure and encrypted form. Thus, two encryption stages are required in that scenario.

In order for this transfer to occur, a first set of private keys must be transmitted from the computer 178 to locks 100'. This could be accomplished using a wired connection, such as connection 168 (FIG. 5) or via a wireless connection that has added security, such as taking place within a given proximity, such as field 172. Once those private keys are stored to both computer 178 and to lock 100', public keys may be transferred, as discussed above, which then establishes a secure channel for communicating information (i.e., two-way asymmetric encryption). From there, public and private keys that will be used by hotel guests are transferred via the secure communication channel that has been established from TRNG 118, to computer 178, to computer 100', and then to user device 164.

With reference again to FIG. 1, preferred embodiments of the invention include a visual indicator 180, such as an LED light, or audio indicator, such as a siren, that that indicates at least one of: (i) that the lock is in the locked mode; (ii) that the lock is in the unlocked mode; (iii) the lock switching from the locked mode to unlocked mode or vice versa; or (iv) a malfunction state. For example, when the lock 100 is in the locked mode, visual indicator 180 illuminates green and, when the lock is in the unlocked mode, visual indicator illuminates red. When lock 100 is in the process of unlocking, visual indicator 180 flashes red. When lock 100 is in the process of locking, visual indicator 180 flashes green. When lock 100 is in a malfunction state, such as when a battery has died or the lock has become disconnected form the wireless network, visual indictor 180 illuminates amber.

Figure 9:
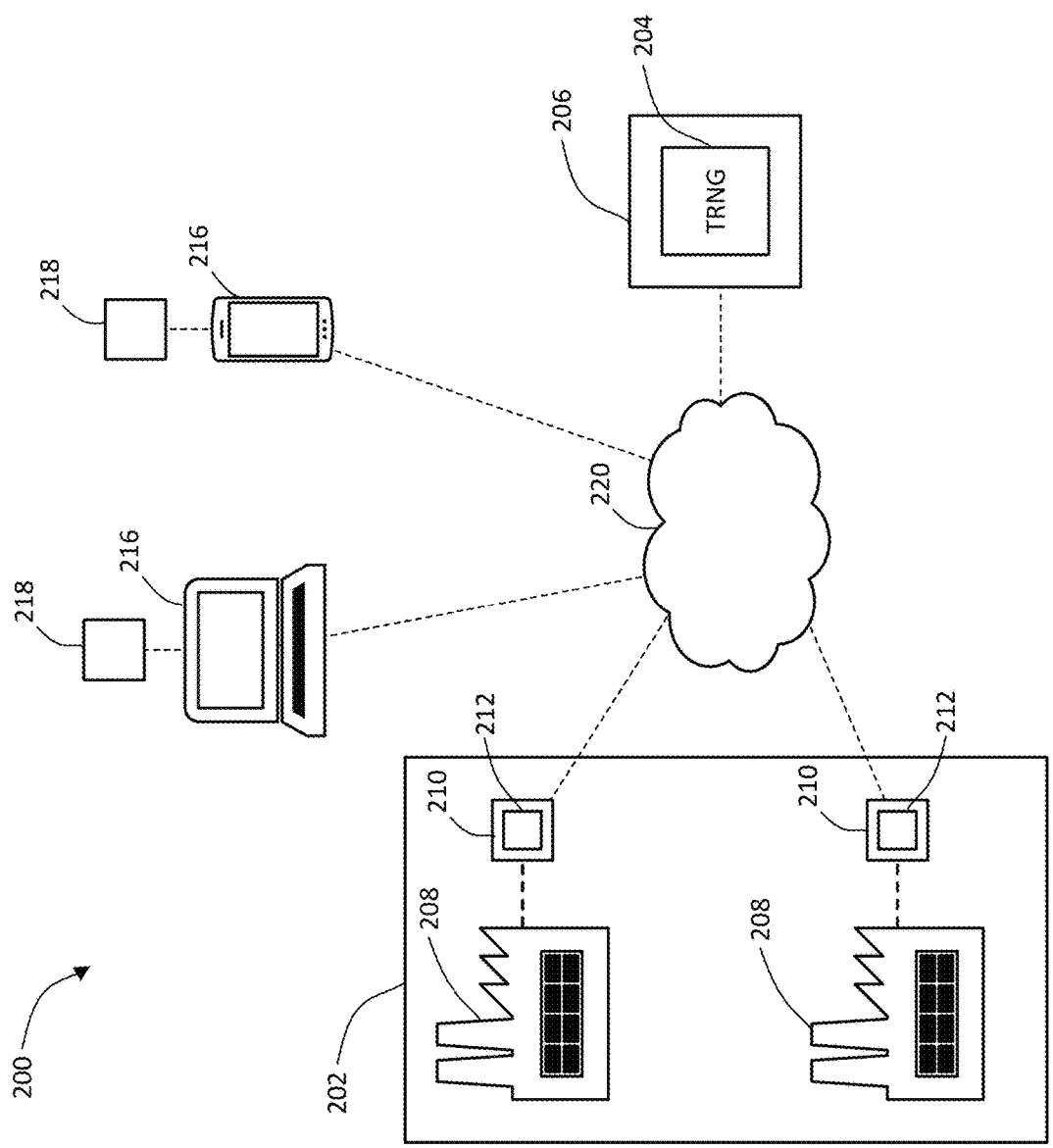
FIG. 9 is a schematic diagram illustrating a tamper-resistant access restriction system according to an embodiment of the present invention.

Referring now to FIG. 9, there is a tamper-resistant access restriction system 200 according to an embodiment of the present invention. The term "tamper resistant" means that this system 200 is resistant to electronic hacking and unwanted computer trespass. In this particular case, system 200 is used to secure at least a portion of a "smart factory" 202 that is provided with a plurality of inter-connected devices that each execute one or more factory tasks, working cooperatively together, to carry out a factory process. However, the system 200 may be used to secure any type of facility or other system of one or more components where access restrictions are desired.

The system 200 includes a TRNG 204 that is configured to generate true random keys that are based on quantum-level physical properties. These keys are used to unlock functionality or access to portions of the system 200 in substantially the same way that the public and private keys discussed above were used to unlock the previously-discussed lock 100. The public and private keys above were used in unlocking locks 100 that would enable a door to be opened. In this case, similar keys are used to enable machinery or other components in a factory (and elsewhere) to be accessed and to carry out certain functions. The TRNG 204 is configured to communicate keys to a hub computer 206, and the hub computer is then configured to distribute those keys to other devices within the system 200. In this particular embodiment, the TRNG 204 is formed as part of the hub computer 206. However, in other embodiments, they may be formed as separate components that are configured to communicate with one another through a wired, wireless, local or remote connection.

At least some of the inter-connected devices within the system 200 are access-restricted components 208 that are secured such that they execute one or more tasks only in response to receiving a verified task instruction. In some cases, component 208 is a single factory component that is configured to execute one or more factory tasks in response to receiving a verified task instruction. In other cases, the component 208 includes two or more factory components that are each configured to execute one or more factory tasks (e.g., weld or stack components) in response to a verified task instruction. Additionally, in certain embodiments, the verified task instruction includes timing information for coordinating the timing of the execution of the one or more tasks carried out by the one or more components 208. As such, the tasks may be executed by the one or more components 208 in a coordinated sequence that is at least partially determined by the timing information. In another example, the access-restricted component 208 might be a lock on a door or window within the factory 202 that unlocks or locks only after receiving a verified task instruction telling them to carry out those tasks. More generally, the access-restricted components 208 may include any device that can be configured to carry out a function only after receiving a verified instruction.

A component computer 210 is configured to receive true random keys provided by the hub computer 206 and to store those keys to a memory 212. Keys may be transferred from the hub computer 206 to the component computer 210 using a hard or physical connection (e.g., a USB connection, memory stick, etc.). More preferably, however, keys are transferred from the hub computer 206 to the component computer 210 wirelessly (e.g., Wi-Fi or Bluetooth) over a wireless network 220. The component computers 210 interface with and control the operation of the access-restricted components 208 and function similarly to the control assemblies 102 that interface with and control the operation of the lock assemblies 104 discussed above. The component computer 210 is configured to receive and verify task instructions and to then provide verified task instructions to access-restricted components 208. In certain embodiments, a single component computer 210 and memory 212 may interface with two or more of the access-restricted components 208. However, in preferred embodiments, such as the illustrated embodiment, each access-restricted component 208 is provided with a separate component computer 210 and memory 212. This construction would reduce the possibility that a person gaining access to one component 208 would also have access to other components within the factory 202.

A controller 216 is also configured to receive keys from the hub computer 204 and to store those keys to a memory 218. Keys may be transferred from the hub computer 206 to the component computer 210 using a hard or physical connection (e.g., a USB connection, memory stick, etc.). More preferably, however, keys are transferred from the hub computer 206 to the component computer 210 wirelessly (e.g., Wi-Fi or Bluetooth) over a wireless network 220. The controller 216 functions similarly to the user devices 164 that control the operation of lock assembly 104 discussed above. The controllers 216 control the access-restricted components 208 by providing task requests to component computers 210 (e.g., turn on, turn off, weld, stack, etc.), which task requests are then verified by the component computers and are then passed to the access-restricted components for execution. These task requests may be communicated from the controllers 216 to the component computers 210 and components 208 via a wired or wireless connection (e.g., over network 220). In some cases, the controller 216 is provided in an external user device, such as a tablet, workstation, smartphone, key card, or other similar device. For example, in the case of a mobile device, the controller 216 may be an application loaded to the device that is configured to wirelessly communicate with component computers 210 to provide task requests. In other cases, the controller is formed as part of the hub computer 206 or possibly even the component computer 210.

Task requests sent from controllers 216 include a task instruction paired with at least one of the keys stored to the memory 218. In response to receiving a task request from a controller 216, the component computer 210 verifies the task instruction by comparing and ensuring that the key stored to the memory 212 matches the key that was received from the controller with the task request. If a match is found, the task instruction is verified and the component computer provides the verified task instruction to the access-restricted component. That task is then carried out by the restricted-access component 208. Preferably, all communications between components of the system 200, including the communication of the keys and the task requests, are secured by a tamper-resistant encryption protocol, such as a two-way asymmetric encryption protocol.

In certain embodiments, computers provided in existing computer equipment and other hardware may be converted into a suitable component computer. Among other things, this might require, for example, a software update applied. This update, combined with other new components, such as a suitable TRNG 204 and hub computer 206 (i.e., as part of a retrofit kit) might be used to retrofit existing factories with an access restriction system 200. In other cases, all new hardware may be installed to provide the necessary functionality for existing equipment to function as a component computer as part of an access restriction system 200. For example, a plug-in device (e.g., USB stick, plug-in computer, etc.) may be connected to the existing equipment to provide the necessary functionality. In still other embodiments, an entirely new installation of equipment provided with the necessary functionality may be used.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A tamper-resistant access restriction system:
a true random number generator (TRNG) configured to generate true random keys that are based on quantum-level physical properties;
a hub computer configured to provide true random keys that are generated by the TRNG;
an access-restricted component configured to execute one or more tasks in response to receiving a verified task instruction;
a component computer, separate from the hub computer, that is associated with the access-restricted component, is configured to receive true random keys provided by the hub computer and to store the true random keys received to a memory, and is configured to receive and verify task instructions and to then provide verified task instructions to the access restricted component;
a controller that is configured to provide a task request to the component computer, wherein each task request includes a task instruction paired with a key,
wherein, in response to receiving the task request from the controller, the component computer verifies the task instruction by comparing and ensuring that one of the true random keys stored to the memory matches the key received from the controller with the task request and then provides the verified task to the access-restricted component.

2. The system of claim 1 wherein the access-restricted component is a factory component configured to execute one or more factory tasks in response to receiving a verified task instruction.

3. The system of claim 2 wherein the factory component further comprises two or more factory components that are each configured to execute one or more factory tasks in response to the access-restricted component receiving a verified task instruction.

4. The system of claim 3 wherein the controller is formed as part of the hub computer.

5. The system of claim 3 wherein the controller is an external user device that is configured to transmit the task request to the component computer.

6. The system of claim 5 wherein the controller wirelessly communicates the task request to the component computer over a wireless network.

7. The system of claim 3 wherein the task request includes timing information such that, once the task instruction is verified, the one or more factory tasks are executed by the two or more factory components in a coordinated sequence that is at least partially determined by the timing information.

8. The system of claim 1 wherein the access-restricted component comprises a door having a lock that is configured to unlock in response to the access-restricted component receiving a verified task instruction.

9. The system of claim 1 wherein the component computer comprises a plug-in computer configured to removably connect to the access-restricted component.

10. The system of claim 1 wherein the controller is an application configured to run on a mobile user device.

11. A method for securing a task-performing component comprising the steps of:
providing an access restriction system having:
a true random number generator (TRNG) that is configured to generate true random keys that are based on quantum-level physical properties;
a hub computer that is configured to provide true random keys that are generated by the TRNG;
an access-restricted component configured to execute one or more tasks in response to receiving a verified task instruction;
a component computer, separate from the hub computer, that is configured to receive true random keys provided by the hub computer and to store the true random keys received to a memory, and is configured to receive and verify task instructions and to then provide verified task instructions to the access restricted component;
a controller that is configured to provide a task request to the component computer, wherein each task request includes a task instruction paired with a key;
generating a true random key with the TRNG;
providing the true random key to the component computer using the hub computer;
storing the true random key to the memory of the component computer;
sending a task request from the controller to the component computer;
verifying the task instruction of the task request by ensuring that one of the true random keys stored to the memory matches the key received from the controller with the task request;
providing the verified task to the access-restricted component with the component computer; and
carrying out one or more tasks specified by the task instruction with the access-restricted component.

12. The method of claim 11 further wherein the access-restricted component comprises at least two access-restricted components that are each configured to execute one or more tasks in response to receiving a verified task instruction, wherein the task request includes timing information such that one or more tasks executed by the at least two access-restricted components are executed by the two or more factory components in a coordinated sequence that is at least partially determined by the timing information.

13. The method of claim 11 wherein the controller is an application configured to run on a mobile user device, the method further comprising the step of wirelessly communicating the task request from the mobile user device to the component computer.

14. An access-restricted smart factory configured to carry out a multi-step factory process, the smart factory comprising:
a plurality of factory components that are each configured to execute a factory task, wherein each of the factory components is access restricted such that the factory tasks are only performed in response to the plurality of components receiving a verified task request;
a true random number generator (TRNG) that is configured to generate true random keys that are based on quantum-level physical properties;
a hub computer configured to receive and then distribute true random keys generated by the TRNG;
a controller that is configured to provide task requests that include a key;
a factory component computer, separate from the hub computer, which is in remote communication with the hub computer is configured to receive true random keys distributed by the hub computer, is configured to store the true random keys to a memory, and is configured to receive task requests provided by the controller and to compare the key included with the task request against the true random keys stored to the memory, wherein the factory component computer sends a verified task request to one or more of the factory components if the key included with the task request matches one of the stored true random keys.

15. The smart factory of claim 14 wherein the factory components are configured to work cooperatively with one another such that each of the factory tasks are executed in a time-coordinated fashion as part of the factory process.

16. The smart factory of claim 14 wherein the smart factory includes a separate factory component computer for sending verified task requests to each of the one or more factory components, wherein each factory component computer is in remote communication with the hub computer.

17. The smart factory of claim 14 at least one of the plurality of factory components executes at least two or more factory tasks in response to a single verified task request.

* * * * *